Oct. 26, 1971     C. E. OLIVER     3,615,101
COLLET STOP

Filed March 19, 1969     2 Sheets-Sheet 1

*INVENTOR.*
CLARK E. OLIVER
BY Jack M. Wiseman
ATTORNEY

Oct. 26, 1971  C. E. OLIVER  3,615,101
COLLET STOP

Filed March 19, 1969  2 Sheets-Sheet 2

INVENTOR.
CLARK E. OLIVER
BY
Jack M. Wiseman
ATTORNEY

United States Patent Office 3,615,101
Patented Oct. 26, 1971

3,615,101
COLLET STOP
Clark E. Oliver, 10849 W. Estates Drive,
Cupertino, Calif. 95014
Filed Mar. 19, 1969, Ser. No. 808,500
Int. Cl. B23b 13/12
U.S. Cl. 279—15      13 Claims

ABSTRACT OF THE DISCLOSURE

A collet stop with detachable axially extending collet engaging members retained on an externally threaded cylindrical body by an O-ring. An annular locking member disposed in threaded engagement with the cylindrical body has a tapered end for controlling the extent of the collet engaging members projecting from said body for pressing the collet engaging members into locking engagement with the inner cylindrical wall of a collet. A second annular locking member in threaded engagement with a tapered yieldable threaded end of the cylindrical body retains an adjustably positioned, optionally employed, work stop rod at one end of the cylindrical body opposite from the end of the cylindrical body that holds an optionally employed solid work stop. In a modification of the collet stop, an expansible sleeve is used as the collet engaging member for locking the collet stop with the collet.

BACKGROUND OF THE INVENTION

The present invention relates to improvements in collet stops for use with collets of the type employed in connection with lathes and other machines for holding work.

Generally, one size collet is employed to hold work. In practice, however, the work may vary in diameter. To accommodate the variation in diameter, the collet is either drawn into or drawn from the lathe spindle. To achieve a desired degree of accuracy, the collet work stop is precisely located. Hence, such work stops have been generally movable within the collet and have been adjustable to enable the work to be inserted into the collet to the desired extent. Collets of this general type are disclosed in U.S. Pat. No. 2,502,719 and U.S. Pat. No. 2,469,160.

However, the collet engaging members of the collet stop were not removable so as to permit collet engaging members of various sizes to be locked with the collet body. Hence, the collet stop was limited in use to prescribed internal diameters of the collet. A U.S. patent application was filed by Clark E. Oliver on Mar. 3, 1969 Ser. No. 803,607 for Collet Stop which discloses a collet stop to obviate this problem.

Collet stops heretofore used a locking member for the collet engaging members that was located in a manner so as to be an obstacle for optionally using an adjustably positioned work stop rod retained at an end of the cylindrical body opposite from which is optionally held a solid work stop.

SUMMARY OF THE INVENTION

It is an object of the present invention to provide a collet stop with detachable collet engaging members for enabling a collet to accommodate various diameters of work without either changing the collet or changing the entire collet stop, and with an improved locking member for the collet engaging members to enable an adjustably positioned work stop rod to be optionally employed.

Another object of the present invention is to provide a collet stop with detachable collet engaging members that are retained on the collet stop body by an O-ring radially disposed relative to the axis of the body, and with an improved locking member for the collet engaging members to enable an adjustably positioned work stop rod to be optionally employed.

Another object of the present invention is to provide a collet with an expansible locking sleeve for locking the collet stop to a collet.

A collet stop in which detachable, collet engaging members are retained on an externally threaded cylindrical collet stop body in axial disposed relation thereto by peripherally disposed yieldable retaining means for locking engagement with the inner cylindrical wall of a collet and the collet engaging members are pressed into locking engagement with the collet by a tapered annular locking member which is mounted in threaded engagement on the collet stop body and an adjustably positioned work stop rod received by the cylindrical body and the adjustably positioned work stop is retained in adjusted position by a tapered annular locking member in threaded engagement with a yieldable tapered portion of the cylindrical body.

Other and further objects and features of the present invention will appear upon perusal of the detailed description taken on conjunction with the accompanying drawings.

DESCRIPTION OF THE PREFERRED EMBODIMENTS

Figure 1:
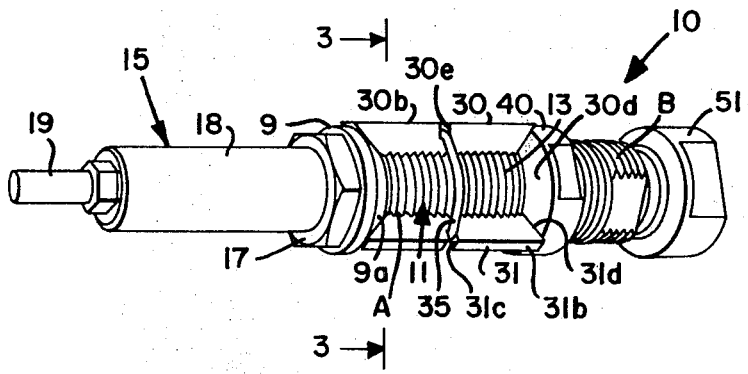
FIG. 1 is a perspective of a collet embodying the present invention shown with a solid work stop received at one end thereof.
Figure 2:
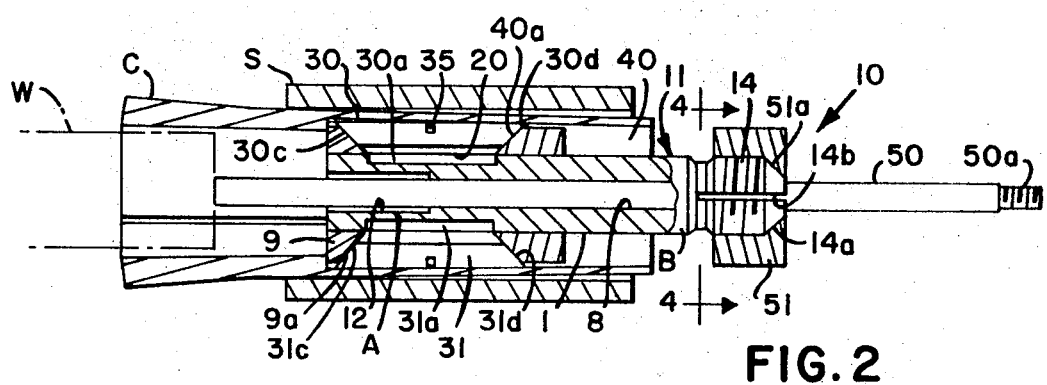
FIG. 2 is a longitudinal sectional view of the collet stop of the present invention illustrated inserted within a collet, which in turn is inserted into a lathe spindle, and also shown with an adjustably positioned work stop received at an end thereof opposite from the end thereof that optionally receives the solid work stop.
Figure 3:
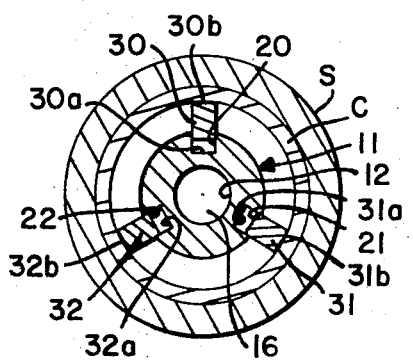
FIG. 3 is a transverse sectional view of the collet stop of the present invention taken along line 3—3 of FIG. 1 and illustrated inserted into a collet, which in turn is inserted into a lathe spindle.
Figure 4:
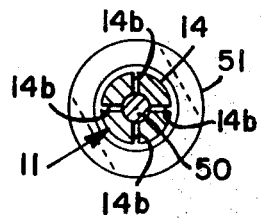
FIG. 4 is a transverse sectional view of the collet stop of the present invention taken along the line 4—4 of FIG. 2.

Illustrated in FIGS. 1-4 is a collet stop 10 of the present invention, which is inserted into a conventional and well-known collet C (FIGS. 2 and 3). In turn, the collet C is mounted within a conventional spindle S for a lath or similar machine. The collet engages work W for holding the same while being machined by the lathe or the like.

The collet stop 10 comprises a cylindrical body 11 with an internally threaded bore 12, a bore 8 and an externally threaded section 13. At the end of the cylindrical body 11 opposite from the threaded bore 12 is an externally threaded section 14 (FIG. 2) with a tapered distal end 14a. The threaded, tapered end section 14 has axially extending slots 14b formed therein of sufficient number to render the tapered threaded distal end 14 relatively yieldable. Surrounding the threaded bore 14 and fixedly secured to the cylindrical body 14 is an annular flange 9 with a tapered end 9a directed downwardly and inwardly taken in the direction toward the threaded end section 14. Optionally received in threaded engagement by the bore 12 is a solid work stop 15. The solid work stop 15 includes a threaded end 16 (FIG. 2) for threaded engagement in the bore 12, a nut shaped portion 17 for conveniently controlling the extent of the penetration of the threaded end 16 into the bore 12, and a work engaging end 18. Should it be desired to have a longer work stop, the work stop 15 has added thereto a detachable work stop extension 19, which is received in threaded engagement by the work engaging end 18. For convenience, an end A of the cylindrical body 11 will be referred to as the work stop end and an end B of the cylindrical body A will be referred to as the locking member end.

Formed in the collet stop body 11 are a plurality of axially extending grooves 20–22, which are spaced about the axis of the body 11 at equal angular distances. Disposed within the grooves 20–22 are axially extending, detachable, collet engaging members 30–32, respectively. Thus, the detachable collet engaging members are spaced about the axis of the body 11 at equal angular distances.

The collet engaging members 30–32 are made of suitable material, such as aluminum, and include inner surfaces 30a–32a disposed within the grooves 20–22, respectively, of the body 11 and outer surfaces 30b–32b protruding from the body 11. The inner surfaces 30a–32a (FIG. 2) are tapered at the opposite ends thereof, such as by tapers 30c–32c and 30d–32d. The tapered ends 30c–32c overlie the tapered end 9a of the flange 9. The portions of the detachable collet engaging members 30–32 that protrude from the body 11 are equal distances from the outer cylindrical wall of the body 11, and, hence, in essence, the surfaces 30b–32b are parallel to the axis of the body 11. It is the surfaces 30b–32b of the members 30–32 that engage the inner cylindrical wall of the collet C (FIGS. 2 and 3) to establish locking engagement therewith. The collet C is mounted securely in the spindle S through inter-engagement between the walls thereof.

For detachably securing the collet engaging members 30–32 to the body 11, an annular, resilient member 35 in the form of O-ring is provided (FIGS. 1 and 2). The O-ring is received in grooves 30e–32e formed in the collet engaging members 30–32.

Through the foregoing arrangement, the collet engaging members 30–32 can be removed from the grooves 20–22, respectively, and replaced with similar collet engaging members of different size. In this manner, collet engaging members of varying heights from the outer cylindrical wall of the body 11 can be employed without changing the entire collet stop 10.

For locking the collet engaging members 30–32 against the inner cylindrical wall of the collet C, a threaded locking member or nut 40 (FIGS. 1 and 2) of suitable material, such as steel, is provided, which is mounted on the externally threaded section 13 of the body 11. The end 40a of the locking member 40 directed toward the work stop end A is tapered inwardly and has a frustoconical configuration. The tapered end 40a of the locking member 40 engages the tapered end surfaces 30d–32d of the collet engaging members 30–32.

When the threaded locking member 40 is rotated to move toward the work stop end A, the collet engaging members 30–32 are moved outwardly against the urgency of the resilient ring 35 to press the surfaces 30b–32b of the collet engaging members 30–32 into locking engagement with the inner cylindrical wall of the collet C by increasing the extent of the protrusion of the members 30–32 from the outer cylindrical wall of the body 11. Conversely, rotating the threaded locking member 40 to move away from the work stop end A, enables the collet engaging members 30–32 to draw inwardly under the action of the resilient ring 35 to reduce the extent of the protrusion of the members 30–32 from the outer cylindrical wall of the body 11.

Optionally received by the bore 8 of the cylindrical body 11 is a detachable, adjustably positioned work stop rod 50 (FIG. 2). It is to be observed that either the solid work stop 15 (FIG. 1) employed or the adjustably positioned work stop rod 50 is employed. The work stop rod 50 when used will extend through the bore 8, through the bore 12 and project outwardly from the work stop end A of the body 11 to engage work W held by the collet C. For convenience, the rod 50 has external threads at 50a. The rod 50 may also be internally threaded.

For locking the work stop rod 50 in an adjustable position, a locking member or nut 51 is received in threaded engagement by the externally threaded portion 14 of the cylindrical body 11. The locking member 51 has a tapered end 51a, which is directed inwardly and downwardly taken in the direction of the threaded end 50a of the work stop rod 50. As the locking member 51 moves in the direction of the work stop A, the tapered end 51a thereof compresses the yieldable distal end 14 of the cylindrical body 11 to lock the work stop rod 50 in its adjusted position. Moving the locking member 51 in a direction away from the work stop end A serves to release the applied force on the distal end 14 of the body 11 to permit expansion thereof so as to enable the rod 50 to move freely in the axial direction relative to the body 11.

Figure 5:
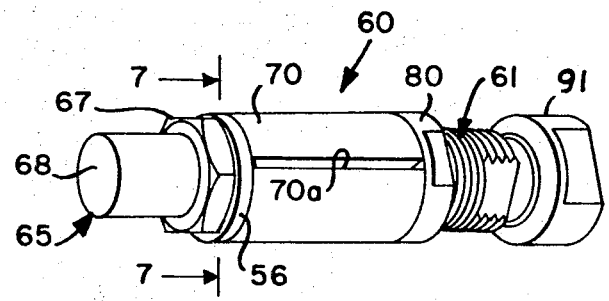
FIG. 5 is a perspective view of a modification of the collet stop of the present invention and illustrating an expansible collet engaging sleeve.
Figure 6:
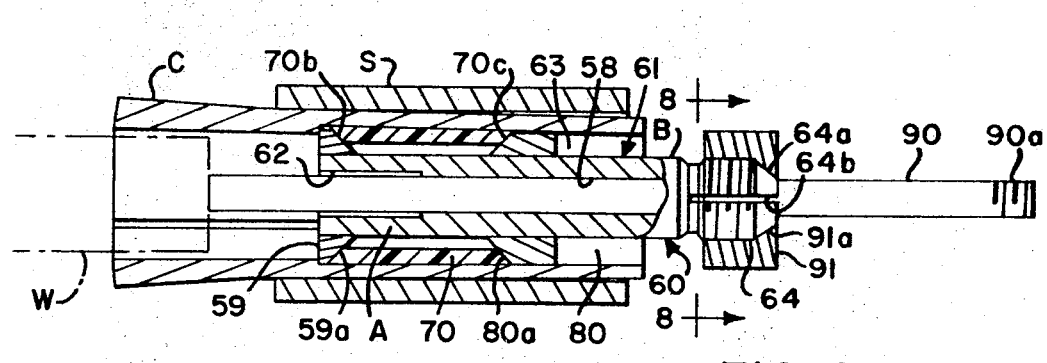
FIG. 6 is a longitudinal sectional view of the modified collet stop of the present invention illustrated inserted into a collet, which in turn is inserted into a lathe spindle.
Figure 7:
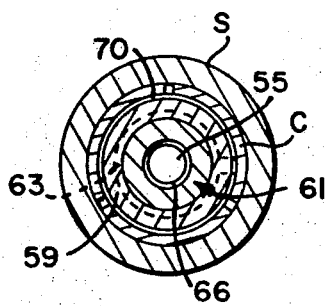
FIG. 7 is a transverse sectional view of the modified collet stop of the present invention taken along line 7—7 of FIG. 5 and illustrated inserted into a collet, which in turn is inserted into a lathe spindle.
Figure 8:
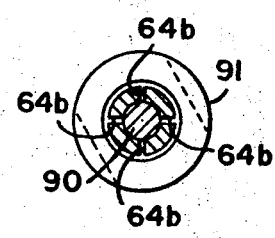
FIG. 8 is a transverse sectional view of the modified collet stop of the present invention taken along the line 8—8 of FIG. 6.

Illustrated in FIGS. 5–8 is a modified collet stop 60 of the present invention, which is inserted into a conventional and well-known collet C (FIGS. 6 and 7). In turn, the collet C is mounted within a conventional spindle S for a lathe or similar machine. The collet C receives work W for holding the same while being machined by the lathe or the like.

The collet stop 60 comprises a cylindrical body 61 with an internally threaded bore 62, a bore 58, and an externally threaded section 63. At the end of the cylindrical body 61 opposite from the threaded bore 62 is an externally threaded section 64 with a tapered distal end 64a. The threaded, tapered end section 64 has axially extending slots 64b formed therein of sufficient number to render the tapered threaded distal end 64 relatively yieldable. Surrounding the threaded bore 52 and fixedly secured to the cylindrical body 61 is an annular flange 59 with a tapered end 59a directed downwardly and inwardly taken in the direction toward the threaded end section 64. Optionally received in threaded engagement by the bore 62 is a solid work stop 65 (FIG. 5). The solid work stop 65 includes a threaded end 66 for threaded engagement in the bore 63, a nut shaped portion 67 for conveniently controlling the extent of penetration of the threaded end 66 into the bore 62, and a work engaging end 68.

Disposed around the cylindrical body 11 is a substantially cylindrical, detachable collet engaging sleeve 70 with an axially disposed slot 70a formed therein. The sleeve 70 is made of a suitable plastic material and is expansible.

Each end of the sleeve 70 is tapered. At one end is a downwardly and inwardly tapered end 70b that overlies the tapered end 59a of the flange 59. It is the outer wall of the sleeve 70 that engage the inner cylindrical wall of the collet C (FIGS. 6 and 7) to establish locking engagement therewith. The collet C is disposed within the spindle S to establish locking engagement therebetween. Thus, the collet C is mounted securely in the spindle S and the collet stop 60 is mounted securely in the collet C through the expansible collet engaging member 70 of the collet stop 60.

For locking the collet engaging sleeve 60 against the inner cylindrical wall of the collet C, a threaded locking member or nut 80 (FIGS. 1 and 2) is provided, which is mounted on the externally threaded section 63 of the body 61. The end 80a of the locking member 80 directed toward the work stop end A is tapered inwardly and has a frusto-conical configuration. The tapered end 80a of the locking member 80 engages the tapered end 70c of the collet engaging sleeve 70.

When the threaded locking member 80 is rotated to move toward the work stop end A, the collet engaging sleeve 70 is moved outwardly to press the outer wall thereof into locking engagement with the inner cylindrical wall of the collet C. Conversely, rotating the threaded locking member 80 to move away from the work stop end A, enables the yieldable sleeve 70 to draw inwardly under the resilient action thereof.

Optionally received by the bore 58 of the cylindrical body 61 is a detachable, adjustably positioned work stop rod 90. It is to be observed that either the solid work stop 65 is employed or the adjustably positioned work stop rod 90 is employed. The work stop rod 90 when used will extend through the bore 58, through the bore 62 and project outwardly from the work stop end A to engage the work W received by the collet C. For convenience, the rod 90 has external threads at 90a.

For locking the work stop rod 90 in an adjustable position, a locking member or nut 91 is received in threaded engagement by the externally threaded portion 64 of the cylindrical body 61. The locking member 91 has a tapered end 91a, which is directed inwardly and downwardly in the direction of the threaded end 90a of the work stop rod 90. As the locking member 91 moves in the direction of the work stop end A, the tapered end 91a thereof compresses the yieldable distal end 64 of the cylindrical body 61 to lock the work stop rod 90 in its adjusted position. Moving the locking member 91 in a direction away from work stop end A serves to release the applied force on the distal end 64 of the body 61 to permit expansion thereof so as to enable the rod 90 to move freely in the axial direction relative to the body 61.

I claim:

1. A collet stop comprising a cylindrical body with a work stop end and a locking end, said locking end being formed with an externally threaded, yieldable section having a taper, a work stop rod adjustably positioned within said cylindrical body and received by said work stop end and said locking end, a rotatable annular locking member disposed in threaded engagement with said externally threaded yieldable section and having a taper engaging the taper of said yieldable section for comprising said yieldable section to lock said work stop rod in the adjusted position, said body being formed with another externally threaded section and formed with a plurality of axially extending grooves, a detachable collet engaging member disposed in each of said grooves, said detachable collet engaging members projecting from said body, each of said detachable collet engaging members being tapered at one end thereof, and a second rotatable annular locking member on said body disposed in threaded engagement with said other externally threaded section of said body, said second rotatable locking member being formed with a taper disposed in engagement with the tapered ends of said detachable collet engaging members for controlling the extent in which said detachable collet engaging members project from said body.

2. A collet stop as claimed in claim 1 wherein each of said detachable collet engaging members is tapered at another end thereof, and an annular flange member mounted on said body with a taper disposed in engagement with said other tapered ends of said detachable collet engaging members.

3. A collet stop as claimed in claim 2 and comprising resilient annular means disposed radially around said body and in engagement with said detachable collet engaging members for retaining said detachable collet engaging members on said body.

4. A collet stop as claimed in claim 3 wherein said resilient annular means comprises an O-ring.

5. A collet stop comprising a cylindrical body with a work stop end and a locking end, said locking end being formed with an externally threaded, yieldable section having a taper, a work stop rod adjustably positioned within said cylindrical body and received by said work stop end and said locking end, a rotatable annular locking member disposed in threaded engagement with said externally threaded yieldable section and having a taper engaging the taper of said yieldable section for compressing said yieldable section to lock said work stop rod in the adjusted position, said body being formed with another externally threaded section, an expansible cylindrical locking sleeve surrounding said body, said cylindrical locking sleeve being formed with a taper at one end thereof, and a second rotatable annular locking member on said body disposed in threaded engagement with said other externally threaded section of said body, said second rotatable locking member being formed with a taper disposed in engagement with the tapered end of said expansible cylindrical sleeve for controlling the extent of the expansion thereof.

6. A collet stop as claimed in claim 5 wherein said expansible cylindrical sleeve is tapered at the other end thereof, and an annular flange member mounted on said body with a taper disposed in engagement with said other tapered end of said expansible cylindrical sleeve.

7. A collet stop comprising an externally threaded cylindrical body having a central bore, a work stop extending through said bore and projecting from said body, yieldable means on said body adapted to be moved radially inwardly to grip said stop and hold it against movement relative to said body, means for urging said yieldable means into gripping engagement with said work stop, locking means on said body and projecting radially from said body, and a rotatable annular locking member disposed on said body in threaded engagement with external threads on said body and in engagement with said locking means for controlling the extent in which said locking means projects radially from said body.

8. A collet stop as claimed in claim 7 wherein said body is formed with a plurality of axially extending grooves, and said locking means comprises a plurality of detachable collet engaging members, a detachable collet engaging member being disposed in each of said grooves, said detachable collet engaging members projecting from said body, each of said detachable collet engaging members being tapered at one end thereof, said rotatable annular locking member being formed with a taper disposed in engagement with the tapered ends of said detachable collet engaging members for controlling the extent in which said detachable collet engaging members project from said body.

9. A collet stop as claimed in claim 8 wherein each of said detachable collet engaging members is tapered at another end thereof, and an annular flange member mounted on said body with a taper disposed in engagement with said other tapered ends of said detachable collet engaging members.

10. A collet stop as claimed in claim 9 and comprising resilient annular means disposed radially around said body and in engagement with said detachable collet engaging members for retaining said detachable collet engaging members on said body.

11. A collet stop as claimed in claim 10 wherein said resilient annular means comprises an O-ring.

12. A collet stop as claimed in claim 7 wherein said locking means comprises a cylindrical expansible locking sleeve surrounding said body, said cylindrical locking sleeve being formed with a taper at one end thereof, said rotatable locking member being formed with a taper disposed in engagement with the tapered end of said expansible cylindrical sleeve for controlling the extent of the expansion thereof.

13. A collet stop as claimed in claim 12 wherein said expansible cylindrical sleeve is tapered at the other end thereof, and an annular flange member mounted on said body with a taper disposed in engagement with said other tapered end of said expansible cylindrical sleeve.

References Cited

UNITED STATES PATENTS

| | | | |
|---|---|---|---|
| 1,455,554 | 5/1923 | Stercklen | 279—1 |
| 2,502,719 | 4/1950 | Haley | 279—1 |
| 2,871,023 | 1/1959 | McCormick | 279—1 |
| 2,965,381 | 12/1960 | Meyer | 279—1 |

FOREIGN PATENTS 610,079  1948  Great Britain.

ANDREW R. JUHASZ, Primary Examiner

D. D. EVENSON, Assistant Examiner

U.S. Cl. X.R.

279—2